US006304437B1

(12) United States Patent
Foo et al.

(10) Patent No.: US 6,304,437 B1
(45) Date of Patent: Oct. 16, 2001

(54) POWER SUPPLY ATTACHMENT FOR TOWER COMPUTER ENCLOSURE

(75) Inventors: Khim Foo, Palo Alto; Steven Furuta, Santa Clara, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/597,965

(22) Filed: Jun. 20, 2000

Related U.S. Application Data

(63) Continuation of application No. 08/890,852, filed on Jul. 10, 1997, now Pat. No. 6,101,097.

(51) Int. Cl.$^7$ .................. G06F 1/16; H05K 7/10
(52) U.S. Cl. .................. 361/683; 361/727; 361/725; 312/223.1; 312/223.2
(58) Field of Search .................. 361/679–686, 361/724–727, 610; 312/223.1, 223.2

(56) References Cited

U.S. PATENT DOCUMENTS

| | | | |
|---|---|---|---|
| 4,498,123 | * 2/1985 | Fuss et al. | 361/683 |
| 4,739,445 | * 4/1988 | Tragen | 361/683 |
| 4,977,532 | * 12/1990 | Borkowicz et al. | 361/683 |
| 5,121,296 | * 6/1992 | Hsu | 361/683 |
| 5,124,885 | * 6/1992 | Liu | 361/683 |
| 5,136,468 | * 8/1992 | Wong et al. | 361/683 |
| 5,159,528 | * 10/1992 | Murphy | 361/683 |
| 5,172,305 | * 12/1992 | DeWilde | 361/683 |
| 5,175,670 | * 12/1992 | Wang | 361/683 |
| 5,397,176 | * 3/1995 | Allen et al. | 312/223.2 |
| 5,460,441 | * 10/1995 | Hastings et al. | 312/223.2 |
| 5,593,219 | * 1/1997 | Ho | 361/683 |
| 5,612,854 | * 3/1997 | Wiscombe et al. | 361/727 |
| 5,737,184 | * 4/1998 | Lai | 361/683 |
| 5,754,396 | * 5/1998 | Felcman et al. | 361/683 |
| 6,097,591 | * 8/2000 | Ircha | 361/683 |

* cited by examiner

*Primary Examiner*—Leo P. Picard
*Assistant Examiner*—Lisa Lea-Edmonds
(74) *Attorney, Agent, or Firm*—Conley, Rose & Tayon, PC; B. Noël Kivlin

(57) ABSTRACT

A tower-type computer power supply is supported from the top of the chassis by tracks so that it may be slid horizontally outward of the back of the chassis. A motherboard is vertically supported between the power supply and a vertical side of the computer. Upon sliding the power supply outwardly to a position where it is still supported by the tracks, the power supply cables may be plugged into the motherboard. When the cables are so connected, they limit outward movement of the power supply. When the power supply is moved inward, the cables are concealed behind the power supply. Outward movement also provides access to sockets on the motherboard for installation or removal of DSIMMs (such as memory cards).

14 Claims, 2 Drawing Sheets

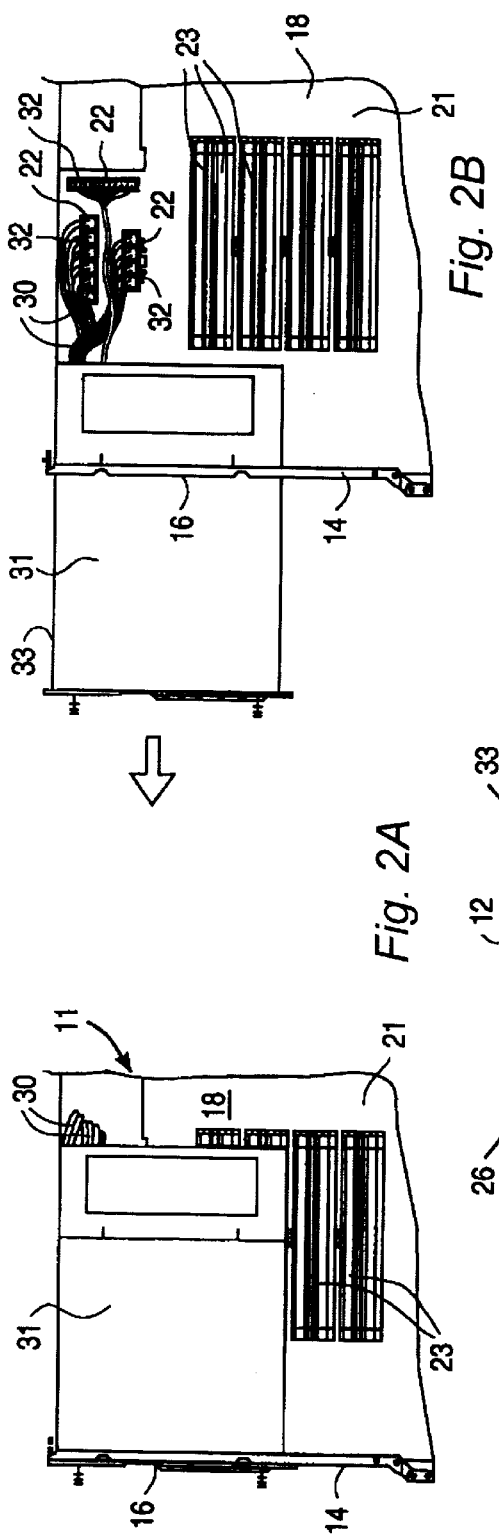
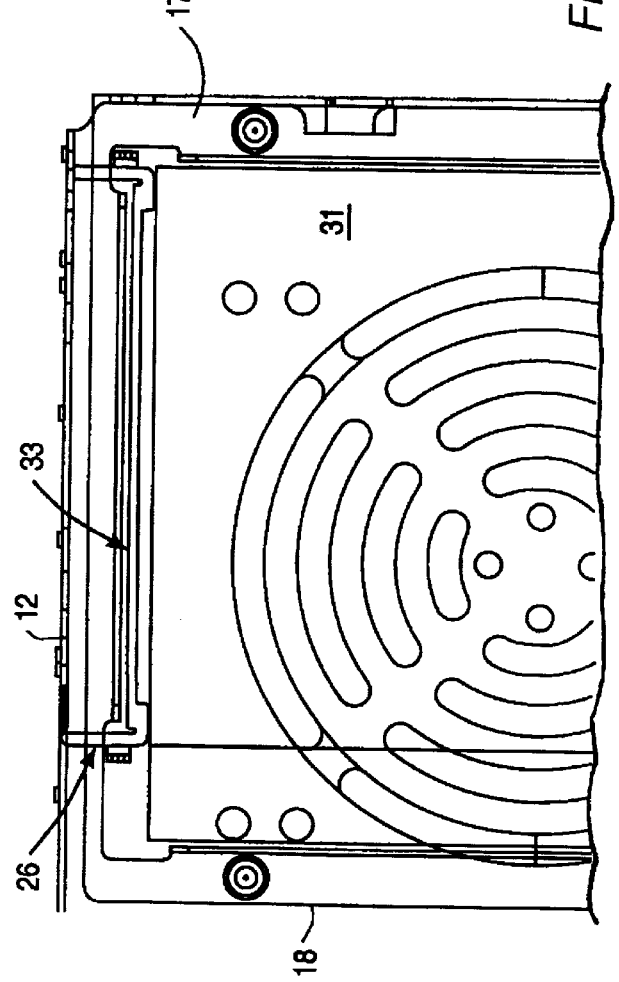

POWER SUPPLY ATTACHMENT FOR TOWER COMPUTER ENCLOSURE

This application is a continuation of Ser. No. 08/890,852 filed Jul. 10, 1997, U.S. Pat. No. 6,101,097.

BACKGROUND OF THE INVENTION

1. Field of the Invention

This invention relates to a new and improved power supply attachment for a tower-type computer housing. More particularly the invention relates to the mounting of a power supply module by means of tracks to interengaging tracks on the underside of the top of a computer chassis. When the power supply is slid outwardly through the back of the chassis to a retracted position, the power supply cables may be inserted in/or removed from sockets in the motherboard of the computer. Further, in the retracted position some of the sockets for memory cards, such as dynamic single inline memory module (DSIMM), are exposed for insertion and removal of cards.

2. Description of Related Art

Industry standards for tower-type computers require that the power supply be mounted in the top of the tower. Heretofore such power supplies have obscured a part of the computer motherboard. By mounting the power supply on rails, the power supply may be slid partially out of the back of the chassis, exposing sockets for the power supply cables and also exposing some of the sockets for cards such as DSIMMs. This accomplishes more effective space utilization.

SUMMARY OF THE INVENTION

A chassis for a tower-type computer is provided with an open left side which is normally closed by a cover. There is a hole provided in the back of the chassis large enough for the power supply to be inserted therethrough or slid outwardly therefrom. The power supply has rails on its upper surface and there are corresponding rails on the underside of the top of the chassis. When the power supply is slid outwardly so that it is almost entirely removed from the chassis, the motherboard is exposed. Cables of the power supply have plugs which are inserted in sockets in the motherboard so that the plugs may be unplugged or installed. Further, when the power supply is slid to its outward position some sockets for memory cards, such as DSIMMs, are exposed. Thus memory cards may be inserted and removed from such sockets.

When the power supply is slid back into the housing, the flexible, soft cables are tucked between the power supply and the motherboard where they do not interfere with other components in the enclosure. When required, the power supply may be totally removed by disconnecting the cable connectors from the motherboard. Unless these connectors are unplugged, the length of the cable limits the outward movement of the power supply on its tracks.

The power supply is locked in place by four captive screws. In the event of service or other access to the motherboard, the power supply needs to be removed. The power supply may be slid outwardly of the chassis once its cables have been unplugged.

The slides by which the power supply is supported are simple channel rails which are self-lubricating and are weighted by the power supply.

Air intake into the power supply must be efficient so as to ensure the high power components remain cool and operating. Accordingly the cables branching out from the power supply are bundled and looped so that the ventilation holes are not obstructed.

BRIEF DESCRIPTION OF THE DRAWINGS

The accompanying drawings, which are incorporated in and form a part of this specification, illustrate embodiments of the invention and, together with the description serve to explain the principles of the invention.

FIG. 2A is a fragmentary side elevational view showing the power supply in its inward position.

FIG. 2B is a view similar to FIG. 2A showing the power supply partly slid out through an opening in the back of the chassis of the computer.

FIG. 3 is a fragmentary rear elevational view.

DESCRIPTION OF THE PREFERRED EMBODIMENT

Figure 1:
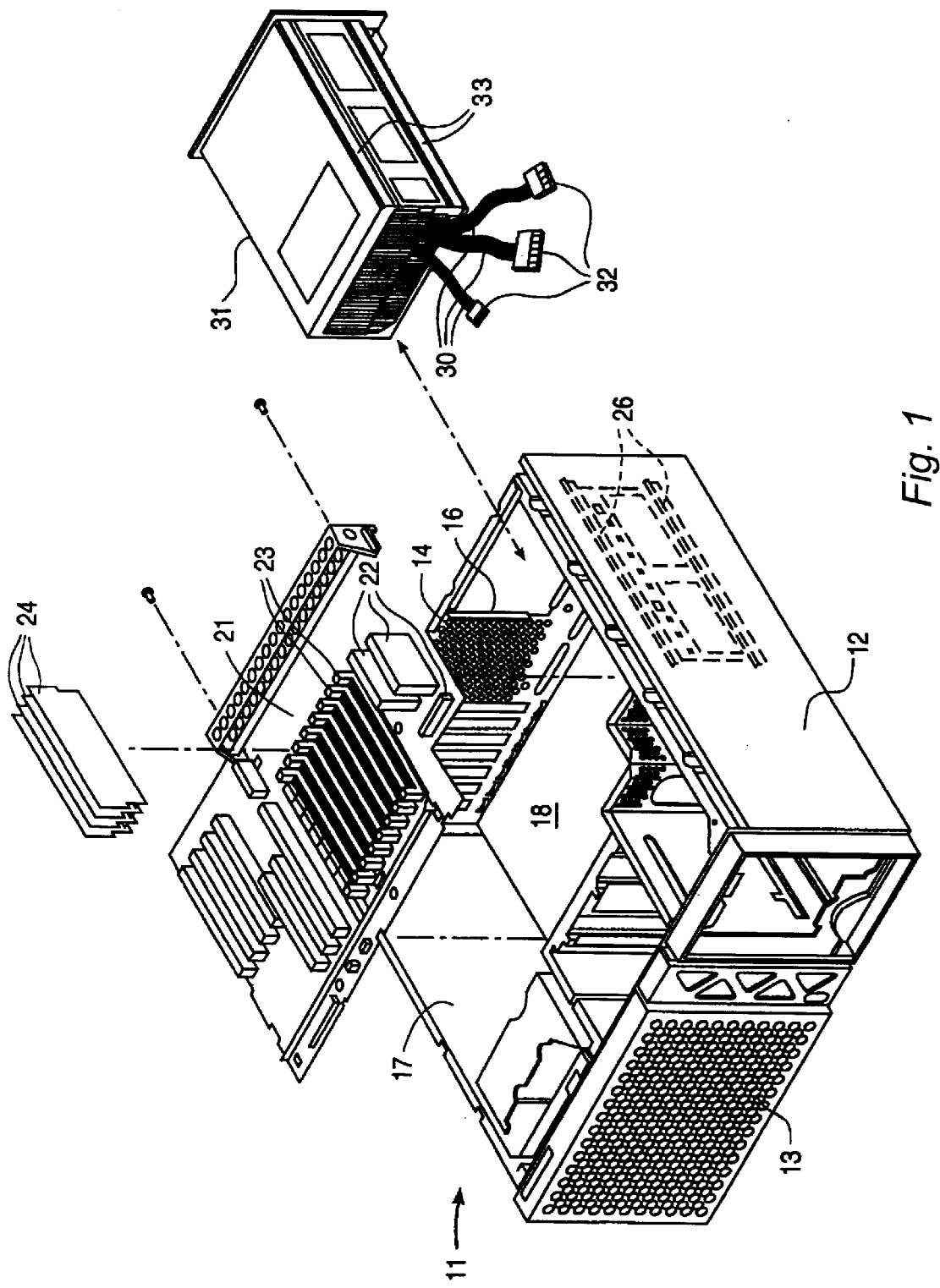
FIG. 1 is an exploded perspective view of components of a tower-type computer with the computer rotated 90° so that it is resting on its right side.

Reference will now be made in detail to the preferred embodiment of the invention, examples of which are illustrated in the accompanying drawings. While the invention will be described in conjunction with the preferred embodiment, it will be understood that there is no intention to limit the invention to the described embodiment. On the contrary, the invention is intended to cover alternatives, modifications and equivalents, which may be included within the spirit and scope of the invention as defined by the appended claims.

A tower-type computer chassis 11 is illustrated in FIG. 1 shown on its right side. Such a chassis 11 has a top 12, front 13 and back 14. Back 14 is formed with a rectangular opening 16 for insertion and removal of a power supply. As shown in FIG. 1 the left side of the chassis is removed and the right side 18 is exposed.

Motherboard 21 is shaped to be attached to right side 18 by captive screws. The motherboard 21 is subject to considerable variation in its components. As illustrated herein, there are three sockets 22 for complementary plugs 32 of the cables of the power supply unit 31. The motherboard also contains sockets 23 for DSIMMs such as memory cards, some of which are located near the top of the motherboard where they are concealed by the power supply unit 31 when in "inward" position. When the power supply unit 31 is removed or slid outwardly to a retracted position (as hereinafter described) some of the sockets 23 which would otherwise be concealed are exposed for insertion and removal of cards 24. Furthermore, the sockets 22 are behind the power supply unit 31 when it is in fully inserted position. On the underside of top 12 are channel-shaped rails 26.

Power supply unit 31 may be of a number of different constructions. Industry standards prefer that such units be installed at the top of the tower and hence the bulk and weight of the unit interferes with access to the motherboard 21. Cables 30 having cable plugs 32 are provided extending from the inside of the unit. Such plugs 32 may be inserted in the sockets 22 when the motherboard is installed and the unit 31 is in retracted position. Track 33 on the top 34 of the unit 31 interengages with rails 26 so that the unit may be slid from its fully in position shown in FIG. 2A to its retracted position shown in FIG. 2B. The cables 30 limit the outward movement of the unit 31. If the plugs 32 are disconnected from the motherboard, then the unit 31 may be fully removed from the chassis. When the plugs 32 are inserted in the sockets 22 and the unit 31 is slid into the chassis, the cables 30 are tucked between the unit 31 and the motherboard 21 where they are out of the way and do not interfere with functioning of the other components attached to the motherboard (FIG. 2A).

When the unit 31 is in the position shown in FIG. 2B access to the sockets 23 is provided and certain repair and maintenance functions may be performed. In order to remove the motherboard 21, however, the unit 31 must be fully withdrawn. FIG. 2A, FIG. 2B, and FIG. 3 depict metallic outer end 36 of the power supply unit 31.

The foregoing descriptions of a specific embodiment of the present invention have been presented for purposes of illustration and description. They are not intended to be exhaustive or to limit the invention to the precise forms disclosed, and obviously many modifications and variations are possible in light of the above teaching. The embodiment was chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A power supply construction comprising:
   a chassis comprising a first side, back, front, first top and bottom;
   a detachable second side opposite to said first side, said back being formed with an opening;
   a motherboard attached to said first side;
   a power supply unit parallel to and spaced laterally from said motherboard, said power supply unit having a second top;
   first tracks under said first top; and
   second tracks on top of said power supply unit suspending said power supply unit whereby said power supply unit may be moved from a first position within said chassis to a second position at least partially retracted from said chassis.

2. A power supply according to claim 1 in which said power supply unit has at least one power cord having a first connector and said motherboard has a second connector detachable engaging said first connector, said power cord having a length to restrain outward movement of said power supply unit beyond said second position.

3. A power supply according to claim 2 in which said power supply unit may be removed from engagement with said chassis by disengaging said connectors and withdrawing said power supply unit beyond said second position.

4. A power supply according to claim 2 in which said tracks comprise pairs of channels, said channels being under said first top and atop said second top, said channels interengaging.

5. A power supply according to claim 2 in which said power cord is stored between said motherboard and said power supply unit when said power supply unit is in said first position.

6. A power supply according to claim 1 in which said motherboard is provided with a socket for at least one memory card, said socket being exposed when said power supply unit is in said second position and concealed when in said first position, and wherein said power supply unit is configured to extend over at least the one memory card when the power supply unit is in the first position.

7. A power supply according to claim 1 in which said chassis is metallic and said power supply has a metallic outer end.

8. A computer comprising:
   an enclosure having a first top with a lower surface, and a wall with an opening extending therethrough;
   a power supply comprising a second top with an upper surface; and
   a first pair of tracks fixed to the lower surface of the first top and a second pair of tracks fixed to the upper surface of the second top, the first pair of tracks interengaging with the second pair of tracks to suspend the power supply from the first top,
   whereby the power supply is capable of being moved from a first position within the enclosure through the opening to a second position at least partially withdrawn from the enclosure.

9. A computer according to claim 8 further comprising at least one cable coupling the power supply to the computer, the cable having a length adapted to restrain movement of the power supply beyond the second position.

10. A computer according to claim 9 wherein the cable has a first connector and the power supply has a second connector detachably engaging the first connector, and wherein the power supply is adapted to be removed from the enclosure by disengaging the first and second connectors and by moving the power supply beyond the second position.

11. A computer according to claim 9 wherein the cable comprises a power cord coupling the power supply to a board in the computer.

12. A computer according to claim 11 wherein the enclosure further comprises a fixed sidewall to which the board is attached, and a detachable sidewall opposite the fixed sidewall, and wherein when the power supply is adapted to provide substantially unobstructed access to the board when in the second position.

13. A computer according to claim 11 wherein the board further comprises at least one socket adapted to receive an electronic module, and wherein the socket is accessible when the power supply is in the second position and inaccessible when the power supply is in the first position.

14. A computer according to claim 11 wherein the board comprises a surface that is parallel to and spaced apart from the power supply, and wherein the power cord is stored between the board and the power supply when the power supply is in the first position to reduce electromagnetic interference with components in the computer caused by electrical current passing through the power cord.

* * * * *